United States Patent [19]

Vaillancourt

[11] 3,734,322
[45] May 22, 1973

[54] FREIGHTING FRAMES FOR AUTOMOBILES

[76] Inventor: Wilfred Vaillancourt, 363 North Street, Sault Saint Marie, Ontario, Canada

[22] Filed: July 14, 1971

[21] Appl. No.: 162,363

[52] U.S. Cl. .................................. 214/450, 214/85.1
[51] Int. Cl. ............................................. B60r 9/00
[58] Field of Search ..................... 214/450, 85, 85.1; 14/71; 182/88, 207

[56] References Cited

UNITED STATES PATENTS

| | | | |
|---|---|---|---|
| 3,612,366 | 10/1971 | Schneider | 214/450 |
| 3,527,371 | 9/1970 | Townsend | 214/450 |
| 3,571,836 | 3/1971 | Dunlap | 14/71 |
| 3,357,582 | 12/1967 | Wittek | 214/38 C |

*Primary Examiner*—Gerald M. Forlenza
*Assistant Examiner*—John Mannix
*Attorney*—Roman J. Filipkowski

[57] ABSTRACT

A freighting frame which is capable of being mounted upon an automobile having a rear bumper and a rear deck comprises two telescopingly nested rectangular elongate half-frames, one of which is a mounted half-frame, the other being withdrawable on rollers. By resting one end of the withdrawn half-frame on the roadway and pin-joining its forward end to the mounted half-frame an incline is provided along which heavy articles may be slid to load them. Each half-frame comprises a pair of longitudinal side beams having vertical webs and horizontal upper flanges spaced by transverse bars. The mounted half-frame is carried on a pair of rear posts fixed to the webs and adjustable in length and pivotedly secured on bumper brackets, and also carried by an intermediate pair of posts standing on resilient suction-cup feet adjacent the rear window. When in the transport mode the nested half-frames have their upper flanges clampedly interlocked at each end to rigidify the composite side beams so formed, permitting very light sheet metal construction — e.g., aluminum alloy — to safely carry larger loads at high vehicle speed.

12 Claims, 8 Drawing Figures

Patented May 22, 1973
3,734,322
3 Sheets-Sheet 1
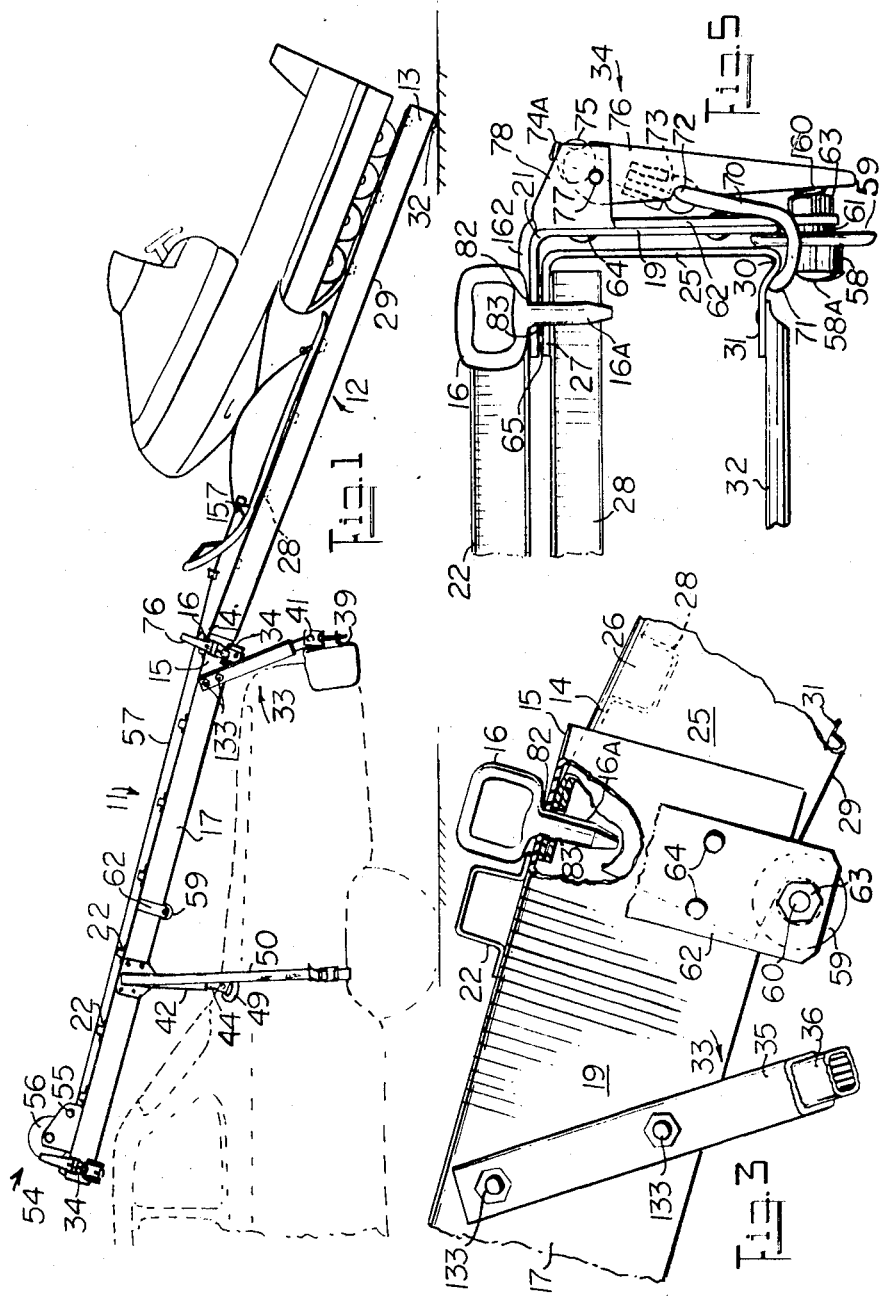
INVENTOR
WILFRED VAILLANCOURT
BY R.J. Filipkowski
patent agent Patented May 22, 1973
3,734,322
3 Sheets-Sheet 2
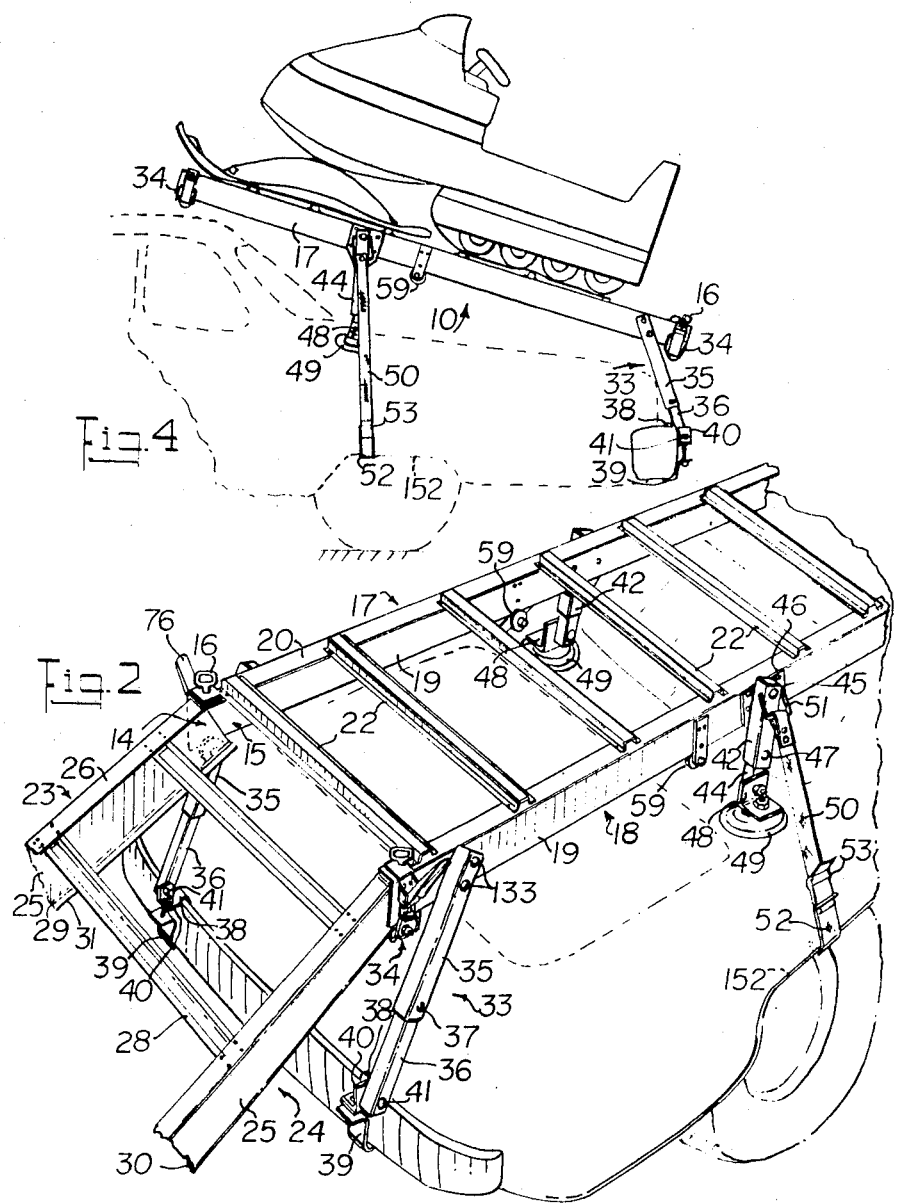
INVENTOR
WILFRED VAILLANCOURT
BY
R.J. Filipkowski
patent agent

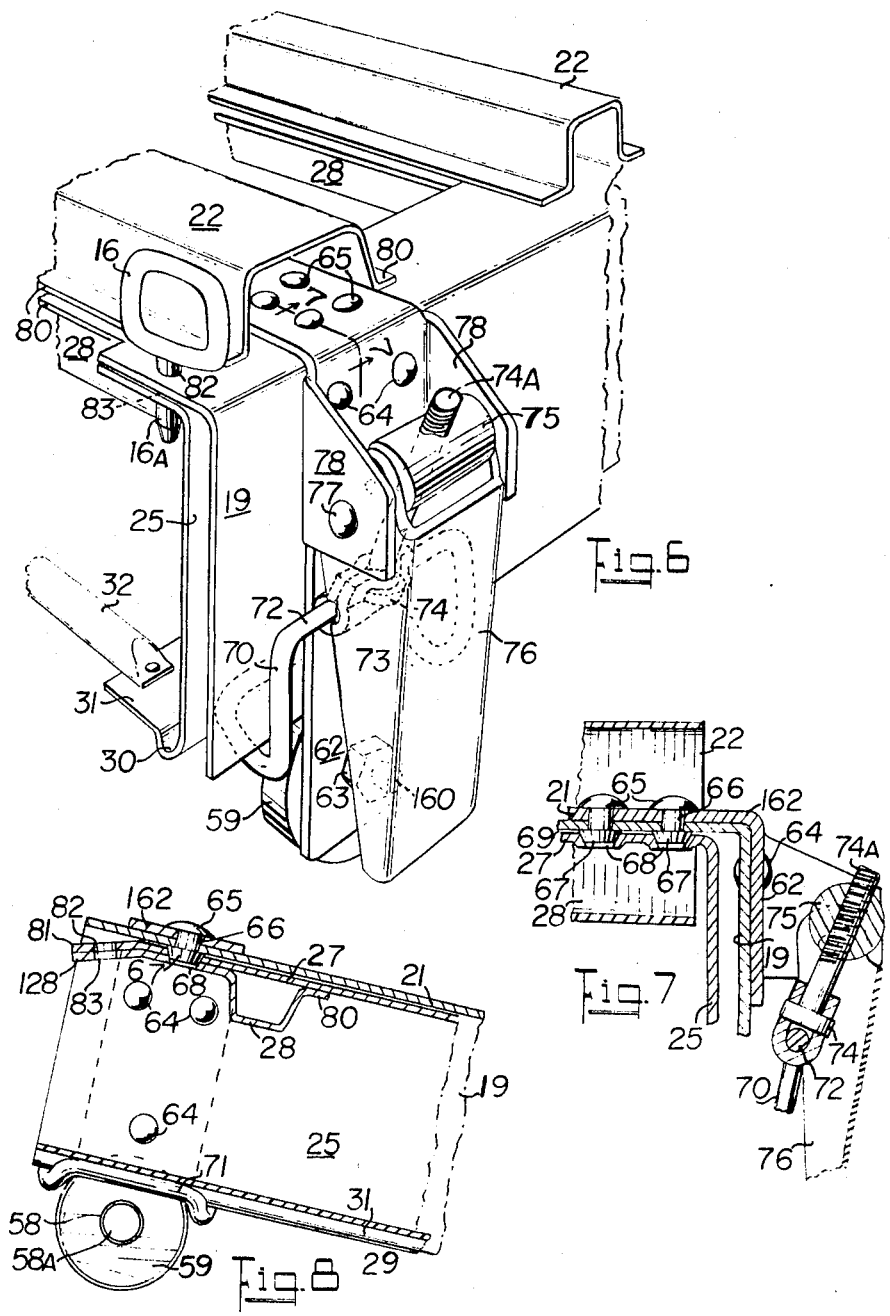

FREIGHTING FRAMES FOR AUTOMOBILES

This invention relates to freighting frames for carrying loads, adapted for mounting on the rearward part of a motor vehicle, and more particularly concerns a demountably mounted freighting frame which may be separated into two similar half-frame portions by withdrawing one of the halves which may then be inclined between a roadway and the rear end of the mounted half-frame portion to facilitate loading or unloading. The withdrawn half-frame portion may thereafter be returned to nested assembly relation with the mounted half-frame portion and interlocked therewith to provide a strong load-supporting carrier.

It has been increasingly desirable to utilize the larger sizes of automobiles having a body form providing a rear deck as freighting vehicles for transporting equipment weighing up to several hundred pounds, such as camping equipment, boats, appliances, and over-snow vehicles. The use of towed trailers for movement of equipment having a transport width which is considerably less than the width of the automobile is unsatisfactory, because of difficulties in parking and maneouvering the train, maintaining required lamp signals and braking devices, and because of the extra space needed to store the bulky towed vehicle when not in use.

Among the prior art carriers proposed to be fitted on some portion of a vehicle such as an automobile or truck, there is described in Canada Patent No. 200,979 to Meiklejohn, a tractor loading arrangement using a pair of grooved planks to form an inclined ramp or skidway along which the tractor may be guidedly raised from the ground to the level of a truck bed by means of a winch and cable. After the loading operation, the ramp components are merely secured on the vehicle bed as part of the load, contributing no strength to the vehicle frame.

It is particularly desirable to minimize the weight while enhancing the strength and rigidity of load-carrying frame structures that may be secured on an automobile rear deck and rear bumper, to provide as large a factor of safety as possible at highway speeds when carrying recreation equipment weighing perhaps 400 pounds. Nevertheless, the elements of the demountable carrier structure must not be so cumbersome as to deny easy handling by women or children, and the structure must permit easy loading and unloading of equipment. In order to satisfy these difficult objectives I have devised a composite freighting frame of flat panel form, having a width dimension about half the width of the automobile which carries it, comprised of two similar half-frame portions which, in the transport mode, are nested and interlocked together in such a way as to gain in stiffness and strength beyond the sum of these parameters when calculated for the half-frame portions individually; one of the half-frame portions may readily be separated from the other when the vehicle is stationary and then may be recombined as an inclined loading trackway connected to a load-receiving automobile-mounted panel, either of which in the loading mode is made adequately strong to withstand loads being put on or removed. The half-frame portion serving as inclined trackway is a simple beam supported by its ends on the roadway and on the mounted half-frame portion, and is provided with beam elements having a larger moment of inertia than the beam elements of the mounted half-frame portion, which is mounted with one end rigidly fixed on the rear bumper and is supported also intermediate its ends on posts.

I have found that each half-frame portion may be fabricated in sheet metal, for example, to realize a pair of remarkably light structures capable of withstanding the stresses imposed in loading or unloading a weighty article, whether these structures serve as the inclined trackway or as the mounted panel; and that when the half-frame portions are assembled in the unitary nested relation, and have their end portions rigidly clamped together by applying clamping force perpendicular to the plane of the panels, a degree of interlocking can be realized greatly augmenting the torsional and bending stiffness of the assembly. As a consequence, a high factor of safety may be obtained in such a composite freighting frame when subjected to acceleration forces as the vehicle carrying the freighting frame makes sharp turns, travels on rough roads or makes sudden braking stops.

Essentially the invention consists in the construction of a freighting frame and mounting bracket and standoff means for securing the freighting frame on an automobile, comprising a pair of half-frame structures of flat panel form, each half-frame comprising a pair of longitudinal side beams joined together by transverse load-support elements constituting, with said side beams, a planar support surface; one half-frame structure is made removably mountable on an automobile by legs fixed on the ends of its side beams, which stand upon the rear bumper, and this half-frame structure is further supported intermediate its length by struts fixed on the side beams, which bear on the rear deck of the automobile; respective side beams of the half-frame are made relatively longitudinally movable one within the other, and of equal length, and are provided with clamps to engage end portions and to interlock such end portions when in transport mode; and the half-frame structures are provided with means for joining them in end-to-end relationship when one half-frame is withdrawn rearwardly to form an inclined trackway for hauling heavy equipment from a roadway onto the mounted half-frame.

In carrying the invention into effect, the half-frame structures are shaped to similar rectangular plan forms and have parallel side beams of formed sheet metal, folded by right-angle bends to produce web and flange elements connected together by transverse bars, channels, or rollers spaced along the length of each side beam. The withdrawable half-frame has a vertical web and carries both upper and lower flanges joined to the web, while the mounted half-frame lacks any lower flange. The side beams are so dimensioned and spaced apart by the associated transverse load-support elements as to enable free insertion and nesting of the withdrawable half-frame within the mounted half-frame with its upper flanges closely adjacent the undersurfaces of the upper flanges of the mounted half-frame, and with its webs spaced inwardly to provide a clearance distance from adjacent webs of the mounted half-frame. Toggling clamps affixed on the exterior of the side beams of the mounted half-frame are actuateable to engage the side beams of the withdrawable half-frame and to draw such side beams into locking engagement with the outer side beams of the freighting frame. The assembly is thereby unified so that the load-induced stresses in the frame elements are resisted by a composite beam resulting from the interlocking, along each side of the freighting frame, having appreciably deeper combined section with a section modulus greater than the sum of the section moduli for each half-frame independently of the other. There is thus realised a generally stronger freighting frame, carrying lower torsional, shear, compressive, and tensile stresses for a given freight load, then if the half-frames were not so assembled and clamped.

According to the invention, a desirable feature expressed in preferred embodiments thereof is the provision of roller guides carried below the side beams of the mounted half-frame for facilitating free insertion of the withdrawable half-frame, such guide rollers being provided with disc flanges of substantial diameter acting as web-spacing and web-gripping elements cooperating with the clamping means to hold adjacent webs in frictionally locked engagement.

A number of additional features expressed in preferred embodiments of the invention will become apparent from a careful reading of the following description thereof, in conjunction with the accompanying figures of drawing wherein:

FIG. 1 is a side elevation view of the freighting frame of the invention as fitted on an automobile with the half-frame portions thereof joined end-to-end, in process of loading equipment from a roadway;

FIG. 2 is a perspective view in enlarged scale showing part of the half-frames in the joined stage of FIG. 1;

FIG. 3 is a side elevation view in enlarged scale showing the joint between end portions of side beams of the FIG. 1 arrangement;

FIG. 4 is a side elevation view of the structure of FIG. 1 as assembled in transport mode, carrying a freight load;

FIG. 5 is an end elevation view in enlarged scale of one side of the assembly of FIG. 4 showing side beam clamping and interlocking;

FIG. 6 is an enlarged scale perspective view showing the clamp of FIG. 5 and flange interlocking developed by clamp pressure;

FIG. 7 is an elevational view in enlarged scale along a transverse section designated by section line 7—7 of FIG. 6; and, FIG. 8 is an elevational view in enlarged scale along a vertical longitudinal section through the forward end of the frame of FIG. 4.

Referring to the drawing, a freighting frame according to the invention comprises a pair of half-frame portions, consisting of a mounted half-frame 11 and a withdrawable half-frame 12, which are shown joined in FIG. 1 in end-to-end relation to provide a continuous loading incline or trackway. The rearward end 13 of half-frame 12 rests on a roadway and its forward end 14 is received within rearward end 15 of half-frame 11. As may best be seen from FIGS. 2 and 3, ends 14, 15 are held pinned together by ring pins 16 to prevent disengagement during loading operations.

Mounted half-frame 11 comprises parallel spaced-apart side beams designated as left side beam 17 and right side beam 18, of angle form, having their webs 19 disposed in the vertical, and having respective horizontal upper flanges 20, 21 inturned and aligned in a plane. Transverse beam elements 22 are interconnected between the flanges 20, 21 and spaced along their lengths to form a ladder-like trackway. Withdrawable half-frame 12 also comprises parallel side beams 23, 24 of angle form, having their webs 25 disposed in the vertical, and having respective horizontal upper flanges 26, 27 inturned and aligned in a plane, and interconnected by a series of spaced transverse beam elements 28. In addition the webs 25 of side beams 23, 24 carry convexly rounded lower flanges 29, 30 terminating in horizontally inturned short flange portions 31 which are interconnected solely at the rearward extremity of half-frames 12 by a foot bar 32.

The half-frames may be constructed from any suitable structural metal sheet such as sheet steel, sheet alloy steel, sheet aluminum, sheet aluminum alloy, and the like, of a gauge chosen to be sufficiently heavy for the intended loading operations when joined as in FIG. 1. Those skilled in the art may readily compute the side beam strength for a specific cross-section geometry and material thickness adopted. In one practical design constructed and road tested with such test loads as an over-snow vehicle, a box of camping equipment, and a 12-foot aluminum boat, the webs 19 and 25 were made 4 inches deep and the upper flanges were about 2 inches wide, the material being zinc-clad steel of 0.086 inch thickness. As will be more directly apparent from the description hereinafter given in conjunction with FIG. 5, the composite beam depth is enhanced by the stacking of the flange elements such as 21 combined with 27 so that the maximum gain in composite beam strength when interlocked results from choosing relatively thick sheet stock, and hence flange thickness. For example, in constructions realised in aluminum or magnesium alloy sheet, a gauge above 0.100 inch would desirably be chosen, up to about 0.150 inch without excessive weight increase making handling difficult. While the thicker gauges of sheet stock provide advantageous strength gain for the assembled half-frames, structures made of sheet steel in a gauge as low as 0.068 inch have provided adequate strength for transporting loads under about 200 pounds.

The over-all width of a composite freighting frame 10 as indicated generally in FIG. 4 should be well within the breath dimension of the freighting automobile, and specifically may be about 3 feet or less; a width of 32 inches and a length of 8 feet has proven highly successful and economical.

Mounted half-frame 11 is supported by posts 33 strongly secured as by bolts or rivets 133 to the exterior surfaces of webs 19 near the rearward ends 15 of the half-frame but spaced a sufficient distance forwardly to permit mounting of clamp means 34 closely adjacent the ends. Posts 33 are preferably telescopically extensible two-part members, viz. upper and lower members 35, 36 of tubular metal, such as steel or aluminum alloy, disposed in vertical planes but inclined forwardly, and also inclined forwardly with respect to the half-frame 11. The members 35, 36 are rigidly joined as by through-bolts 37 when adjusted to length for a specific vehicle. The lower end of lower member 36 is bolted to a bumper-mounting structure comprising upper and lower clamp parts 38, 39, of which upper part 38 carries the angle bracket 40 supporting the post which is fixed thereto by bolt 41. Half-frame 11 may be swung about bolts 41 if access is desired to a trunk space located under the half-frame.

A further pair of posts 42 are similarly rigidly fixed in vertical planes on the exterior surfaces of webs 21, at a position just forward of the mid-length of the half-frame 11, depending on the length of the trunk portion of the freighting vehicle. The posts 42 similarly comprise telescopically extensible, two-part construction of tubular metal, including upper and lower post portions 43 and 44. Upper portion 43 is preferably secured by bolts 45 passing transversely through the upper portion thereof, clamping it to a web-stiffener plate 46 secured as by rivetting to the web. An adjusting through-bolt 47 joins the portions 43 and 44 at the length chosen for a particular automobile, so that the forward end of the freighting frame will clear the roof. Preferably, the posts 42 are disposed in the vertical to act as a column transferring the load carried by the compositie frame 10 to the reinforced body area conventionally fabricated just forward of the trunk lid hinge line of the vehicle. The lower ends of post portions 44 are boltedly joined to brackets 48 carried by suction cup members 49 which are affixed in conventional manner to the body surface.

As best seen from FIG. 2, the composite frame 10 is held centered above the rear deck of the automobile, i.e., over the trunk area, by means of tension links 50, such as woven nylon or polyester webbings, secured by their one ends in pivoting rings 51 carried by the upper ends of posts 42, and attached by their other ends to hook-ended metal straps 52 carrying tension-adjusting buckles 53 in which the webbings are engaged. The straps 52 may have their interior surfaces covered by a resilient coating or may otherwise be cushioned to prevent marring of the finish, and are so shaped to engage the lower margin 152 of the body in the wheel-well region, e.g., to U-form. When both left and right tension links 50 are suitably tensioned, a downward load is applied to the suction cup members 49 and an upwardly/inwardly directed force is applied to the body margins 152. The links 50 resist the centrifugally induced forces developed as the sutomobile follows a curved road, as well as other lateral forces caused by road conditions.

To facilitate raising loads heavier than can be directly lifted and placed upon the transverse beam elements 22, there may optionally be provided a lifting means such as a conventional winch 54 as seen in FIG. 1 secured in a suitable manner, as between the most forward pair of transverse beam elements 22, by means of which and when an actuating handle is inserted into drive socket 55 the reel 56 may be caused to revolve. Cable 57 thereon is thereby caused to pull a load by means of the bridle 157, the load being here indicated as an over-snow vehicle of several hundred pounds weight, moving it up the inclined trackway formed by the joined half-frames. Once the treight load has been drawn a sufficient distance as to be entirely supported upon the mounted half-frame 11, i.e., in the position shown in FIG. 2, it is lashed in place as by straps, clamps, hooks, ropes, or any suitable securing devices (not shown) demanded by considerations of the safety of the article and in accordance with local legislation governing such loads. The ring pins 16 are thereupon removed, and the withdrawable half-frame 12 is lifted by its lower end 13 and aligned with the mounted half-frame 11, engaging its convexly rounded lower flanges 29, 30 upon the cylindric roller surfaces 58. The distance between the uppermost part of such roller surface and the under-side of upper flange 21 is made sufficiently greater than the web depth of half-frame 12 so that upper flange 27 may move freely under upper flange 21, and similar clearance exists between flanges 26 and 20.

Guide rollers 58 carry integral disc-flanged portions 59, of an axial dimension just enough smaller than the spacing between webs 19 and 25 of telescopingly assembled side beams 17, 23, and 18, 24 to permit free sliding insertion of half-frame 12. Each guide roller 58 is rotatably mounted on an axle bolt 60 having a smoothly rounded head 58A facing inwardly, and an integral shoulder portion 61 permitting clamped mounting on the lower end of support bracket 62 when nut 63 is tightened on threaded reduced-diameter extension 160 of the axle.

A total complement of six rollers is porvided, three along each side beam, comprising two pairs of end-mounted combination clamps and rollers, and an intermediate pair of rollers which are not provided with any clamp device. By this arrangement, the movements of the withdrawable half-frame 12 whether during insertion or withdrawal, are made very easy.

Referring specifically to FIGS. 2, 5, 6 and 7, one form of clamp device highly satisfactory for the purpose of strongly holding end portions of the assembled half-frames connected together as an interlocked, quasi-unitary beam structure, comprises the strap or bracket 62 which extends below webs 19 and which includes a unitary extension 162 that extends over the upper side of upper flanges 20 and 21 and lies closely conformable thereupon. A number of rivets 64 rigidly connect the upright portion of each strap or bracket 62 with the exterior surface of the web, and a further series of special rivets 65 join the horizontal portions 162 with the upper flanges 20 and 21. As apparent from section 7—7, stout rivets 65 have their shanks 66 passed through and closely engaging bores drilled in strap extensions and in the upper flange, and have downwardly facing conically shaped heads 67. The apical angle of the cone sides is preferably under 45°, and should be nearer to 30°. Upper flanges 26 and 27 of the withdrawable half-frame are pierced by holes 68 which ideally are so formed as by piercing and swaging dies as to strengthen and deepen the walls of the apertures, shaping their sides so as to closely engage the sides of the rivet heads 67 received therein. A small clearance distance 69 is preferably allowed between opposed flange surfaces when the heads are closely fitted into holes 68, to allow for wear, or for adherent material on the flanges.

When the upper flanges are so interlocked as to resist relative longitudinal movement, the convexly rounded lower flanges 29, 30 are lifted clear of and ride above the cylindrical rollers 58. This condition is produced by he action of a clamp hook 70 formed of a steel rod bent to the form of a warped ring having the lower hook part 71 inwardly uptruned to engage the convexly curved under-surfaces of flanges 29 or 30.

The clamp hooks straddle the disc-flanged portions 59 of the guide rollers and have upper transverse rod portions 72 carried by a saddle 73. A cheese-headed adjusting bolt 74 rotatable in but captive in the saddle 73 extends upwardly and has its shank portion 74A threadedly engaged in a robust pivot member 75 pivotedly mounted on the upper end of a clamp lever arm 76, which arm is in turn pivotedly mounted as by pivot members 77 secured in the outwardly projecting lugs 78 integral with the strap or bracket 62. In the locked position, FIG. 6, when arm 76 is swung downwardly, the rod member 75 is displaced downwardly and outwardly to its limiting position, drawing clamp hook part 71 firmly against the flanges 29 or 30, and applying compressive loading to engage the adjacent web surfaces in friction-holding engagement with the disc flange 59. Provided that the half-frames are correctly registered, rivet heads 67 are also caused to interlock with upper flanges 26 or 27 of the inserted half-frame 12. It is helpful in bringing the parts into registration prior to locking the clamp to insert ring pins 16 in the bores 82, 83, which are preferably drilled when the side beams have been clamped in interlocked relation, to be a snug fit for the shank 16A.

In order to adequately transfer large clamping forces to light-gauge sheet metal flanges of the thickness dimensions indicated hereinbefore, the transverse elements 22 of the mounted half-frame 11 and the transverse beam elements 28 of the withdrawable half-frame 12 are preferably so arranged that rigidification of the flange areas in the regions of the clamps is effected. To this end, the rearmost beam element 22 is formed as a U-shaped channel opening downwardly, and as shown in FIG. 6 is desirably of such breadth that when its seating flanges 80 are spot-welded or line-welded as by welding rolls to the upper flanges a thickened flange structure is produced immediately adjacent the strap extension 162. Similarly, the rearmost transverse beam element 28 is so disposed and joined with the upper flanges 26 or 27 as to rigidify the sheet metal adjacent the perforations 68. Nevertheless, arrangements of the transverse beam element which reinforce the flange only along one side of strap 162 have utility, but would not be as capable of preventing deflection for extremely large clamping pressures.

Referring additionally to FIG. 8, an interlocking arrangement similar to that provided at the rearward clamps 34 is located at the end of half-frame 12 to connect together the forward ends of the assembled half-frames. Because the location of the most forward transverse beam element 28 is desirably not closely adjacent the forward extremity of half-frame 12, as may be understood from an inspection of FIG. 2, a reinforcing strap extension 128 is preferably provided, which may be an integral extension of a seating flange 80 of the beam element 28, terminating in a downwardly bent tab 81. This tab includes a portion of a flange 26 or 27 similarly downwardly bent, to provide a joining means when pierced by aperture 78 to recieve ring pin 16.

In the unloading of an article from the freighting frame described, lever arms 76 of clamps 34 are lifted up and forced over their toggling points, to cause clamp hooks 71 to be released from and descend below convexly curved flanges 29, 30. With the operator standing to the rear of the vehicle, ring pins 16 are then withdrawn and the withdrawable half-frame 12 is controlled in its rolling-out movement, until foot bar 32 can be set in position allowing the ring pins 16 to be inserted into the bores 82, 83 to join the half-frames in the unloading mode. Thereupon, the freight is simply lifted or slid off, or a reverse winch-assisted procedure is followed until the article is lowered to the roadway.

While one form of the invention has been specifically described in the foregoing, the true scope and extent thereof is defined in and by the accompanying claims.

I claim:

1. A freight transport structure for demountable mounting upon an automobile having a rear bumper and a rear deck, comprising a pair of half-frames each comprising a spaced pair of parallel side beams having a vertical web and an inturned integral upper flange, respective side beams of each half-frame being interconnected by a series of spaced transverse beam elements, two pairs of struts having their one ends adapted for demountable mounting respectively upon said bumper and upon said rear deck and having their other ends fixed exteriorly in spaced relation along respective webs of a mountable half-frame of said pair, the other half-frame having opposed channel side beams spaced to permit free insertion and withdrawal between webs of said mountable half-frame, means to connect flange end portions of said withdrawable half-frame to flange end portions of said mountable hlaf-frame when said half-frames are in longitudinally aligned end-to-end relation to extend an inclined loading trackway from a road, and means to secure respective half-frames in telescoped relation to form a unified freight transport structure comprising: protuberances extending out of the surfaces of upper flanges of one half-frame and mating recesses formed in opposed surface portions of the upper flanges of the other half-frame, and clamp means carried by web portions of the mountable half-frame, said clamp means being actuatable to clamping position to engage a lower flange of said withdrawable half-frame to cause relative movement entering said protuberances into associated recesses to clampedly interlock end portions of said half-frames, and being actuatable to release position to effect disengagement of said half-frames.

2. A freight transport frame as set forth in claim 1 wherein said interlocking protuberances and recesses are located in the forward and rearward end portions of each upper flange and each clamp is located on a web portion laterally adjacent thereto.

3. A freight transport frame as set forth in claim 2 wherein said recesses are formed in the upper flanges of said withdrawable half-frame and said interlocking protuberances comprise cone-headed rivets rivetted on the upper flanges of the moutable half-frame and protruding downwardly, the head height being sufficiently less than the clamp-induced entering movement of one half-frame relative to the other to allow free sliding of the withdrawable half-frame when said clamp means are actuated to release position.

4. a freight transport frame as set forth in claim 3 wherein said withdrawable half-frame has an integral lower flange inturned with respect to each web and includes a convexly downwardly curved ridge merging with the web, and wherein opposed lower flanges are interconnected at their rearward ends by a foot bar adapted to frictionally engage the road when said half-frame is connected in aligned loading relation with said mountable half-frame.

5. A freight transport frame as set forth in claim 3 wherein the apical angl of said cone heads is between about 30° to 45°.

6. A freight transport frame as set forth in claim 2 wherein said transverse beam elements are secured respectively along the upper and the lower surfaces of the upper flanges of said mountable and said withdrawable half-frames and beam elements of the mountable half-frame overlie elements of the withdrawable half-frame when said half-frames are in unified relation.

7. A freight transport frame as set forth in claim 1 wherein a rearward pair of said struts depend adjustably from the rear end of said mountable half-frame and are adapted to make pivoted connection with bracket means fixed on said bumper and wherein th other pair of struts depend adjustably intermediate the ends of said half-frame so as to be adapted to bear adherently resiliently upon an area of said deck just forward of a luggage compartment and are connectable by their upper ends with the vehicle body lower margins by tension straps.

8. A freight transport frame as set forth in claim 4 wherein said means securing said frames together in aligned loading relation comprises guide projections extending normal to the webs of the mountable half-frame adapted to provide support for forward ends of said lower flanges, and pin connecting means insertable in registered apertures in the forward and rearward ends respectively of the upper flanges of said withdrawable and mountable half-frames.

9. A freight transport frame as set forth in claim 8 wherein said projections comprise roller means, spaced pairs of axles fixed in web-supported depending brackets journalling said rollers thereon, said rollers having their cylindric surfaces tangent to a common plane lying below the webs of the mountable half-frame a distance such that when both half-frames are assembled in transport relation said rollers provide guided rolling engagement of said withdrawable half-frame along said ridges and a clearance space is provided between corresponding adjacent parallel upper flanges.

10. A freight transport frame as set forth in claim 9 wherein said rollers have disc flange portions integral therewith located adjacent the web, having an axial thickness such as to provide a running clearance between respective webs of said withdrawable and said mountable half-frames when being assembled or separated.

11. A freight transport frame as set forth in claim 9 wherein the recesses comprise apertures formed by a piercing die drawing the sides of the aperture outwardly of the flange surface and forming the interior surface to the conicity of the protuberances to be engaged therein, but porviding an inter-flange clearance with said protuberances laterally immovably seated in the apertures.

12. A freight transport frame as set forth in claim 11 wherein the clamps are toggling devices having a hook-shaped member movable in a direction normal to the planes of each half-frame for applying lifting pressure to said lower flanges and clamping said disc flanges between adjacently opposed webs.

* * * * *